United States Patent
Sojian et al.

(10) Patent No.: US 7,643,162 B2
(45) Date of Patent: Jan. 5, 2010

(54) SYSTEM AND METHOD FOR STORED RESOURCE OVERLAY

(75) Inventors: Lena Sojian, Fountain Valley, CA (US); Guy Eden, Tustin, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 885 days.

(21) Appl. No.: 10/872,613

(22) Filed: Jun. 21, 2004

(65) Prior Publication Data

US 2005/0179923 A1    Aug. 18, 2005

Related U.S. Application Data

(63) Continuation-in-part of application No. 10/777,347, filed on Feb. 12, 2004.

(51) Int. Cl.
  *G06F 15/00* (2006.01)
  *G06F 3/12* (2006.01)
  *G06K 1/00* (2006.01)
(52) U.S. Cl. .................... 358/1.13; 358/1.15
(58) Field of Classification Search ......... 358/1.1–1.18, 358/3.27, 3.28, 537–540
See application file for complete search history.

(56) References Cited

U.S. PATENT DOCUMENTS

| | | | |
|---|---|---|---|
| 5,452,094 A | 9/1995 | Ebner et al. ............... 358/296 |
| 5,606,429 A | 2/1997 | Sheldon et al. ............. 358/450 |
| 6,919,967 B1 * | 7/2005 | Pentecost et al. ........... 358/1.15 |
| 7,359,070 B1 * | 4/2008 | Smith ........................ 358/1.13 |
| 2002/0144026 A1 * | 10/2002 | Dunlap et al. ................ 710/16 |
| 2005/0162667 A1 * | 7/2005 | Felix et al. .................... 358/1.1 |

* cited by examiner

*Primary Examiner*—Douglas Q Tran
(74) *Attorney, Agent, or Firm*—Law Office of Gerald Maliszewski; Gerald Maliszewski

(57) ABSTRACT

A stored resource overlay system and method are presented. The method comprises: at a MFP, accepting a document, either in tangible form to be copied, or as an electronically formatted scan job; accessing a resource file stored in permanent storage; converting the resource file into an image; merging the image with the document; and, creating a merged document in an electronic format. The saved resource file may represent an image type such as a logo, background, signature, border, graphic, picture, or overlay for example. After accepting the document, it is converted to a rasterized data first image. Likewise, the image, converted from resource file in permanent storage, is supplied as a rasterized data second image. Then, merging the image with the document includes: adding the first image to the second image; and, generating a rasterized data third image. The resource file in permanent storage may be saved in a PDL format for example.

16 Claims, 4 Drawing Sheets

SYSTEM AND METHOD FOR STORED RESOURCE OVERLAY

RELATED APPLICATIONS

This application is a continuation-in-part of a pending patent application entitled, SYSTEM AND METHOD FOR VARIABLE TEXT OVERLAY, invented by Soijan et al, filed Feb. 12, 2004, Ser. No. 10/777,347.

BACKGROUND OF THE INVENTION

1. Field of the Invention

This invention generally relates to digital document processing and, more particularly, to a system and method for using a multifunctional peripheral (MFP) device to merge an image overlay into an independent document.

2. Description of the Related Art

Conventional MFP and copiers do not provide a mechanism that permits a user to automatically add image resources, such as a logo or a background, to the document being copied. For example, if a user wishes to add the company logo to the document being copied, or add a border to the top of the document for identification purposes, the user begins with a copy of a document, takes the document to their desk, and manually applies the modifications to the document. For example, the user may cut-and-paste an overlay onto the document. Alternately, the user may take two separate documents to the printer, and arrange the two documents to create a single copy that includes sections of both of the original documents. Either of these processes is cumbersome and time consuming, wasting company time and resources.

As another alternative, the user can have paper prepared with the logo or border pre-printed on the sheets. However, this solution is expensive and can also be cumbersome. For example, if the user wishes to add the company logo to the document being copied, the user would have to manually place pages that have been pre-printed with the company logo into the appropriate input tray and configure the MFP to select the proper input tray for the copy job. If the paper is inserted into the wrong tray, or if the input tray is not properly configured for the copy job, the copy will not be correct, and the user will be forced to discard the output, and go through the process again.

It is known that a copier may scan an image and store the image as raster data. This raster data image may subsequently be accessed from a memory or a storage device, and combined with other copied documents. However, raster files are extremely large, meaning that only very small images, or a limited number of images can be saved. Alternately, an extremely large copier memory or storage device is required.

It would be advantageous if a process existed for using an MFP to conveniently merge an image, stored in the MFP, into an independent document.

It would be advantageous if the above-mentioned images could be stored in an efficient manner.

SUMMARY OF THE INVENTION

This present invention permits images such as logos, backgrounds, overlays, and other images that have been stored in the MFP mass storage device to be extracted, processed, and overlaid onto all, or selected pages of a document being copied. The invention also permits the placement of different logos, backgrounds, or images on selected pages of the document being copied.

For example, a "Sharp confidential" logo is stored in the copier's mass storage as an image resource, or resource file. The user can select the logo from resource list on copier and have the logo overlaid on every page of their copy job. The same process can also be used for scan jobs. Advantageously, if logo changes, users don't need to update their own PCs with the new logo. A systems administrator changes the logo in the MFP's mass storage, for the benefit of all users.

As a process, the user approaches the copier and is presented with a dynamic list of pre-loaded resources (resource files). The user can select one or more of the image resources and the copier overlays the selected images on their source scan/copy job. Suppose the user would like to make a copy of a memo, with the addition of the company logo at the top of the first page. The user approaches the copier front panel, and using a stylus pen or liquid crystal display (LCD) panel, virtual keyboard, or the like, selects a resource file and positions the accessed image on the image of the copied memo.

Accordingly, a stored resource overlay method is presented. The method comprises: at a MFP, accepting a document, either in tangible form to be copied, or as an electronically formatted scan job; accessing a resource file stored in permanent storage; converting the resource file to an image; merging the image with the document; and, creating a merged document in an electronic format. Typically, the merged document is presented to the MFP print engine for printing in a tangible format such as paper. The resource file saved in permanent storage may be a logo, background, signature, border, graphic, picture, or overlay for example.

More particularly, the method accepts the document and converts the document to a rasterized data first image. Likewise, the resource file accessed from permanent storage is converted and supplied as a rasterized data second image. Then, merging the image with the document includes: adding the first image to the second image; and, generating a rasterized data third image. The resource file in permanent storage may be saved in a format such as PostScript (PS) or portable document format (PDF) for example.

Additional details of the above-described method and an MFP resource overlay system are provided below.

DETAILED DESCRIPTION OF THE PREFERRED EMBODIMENTS

Figure 1:
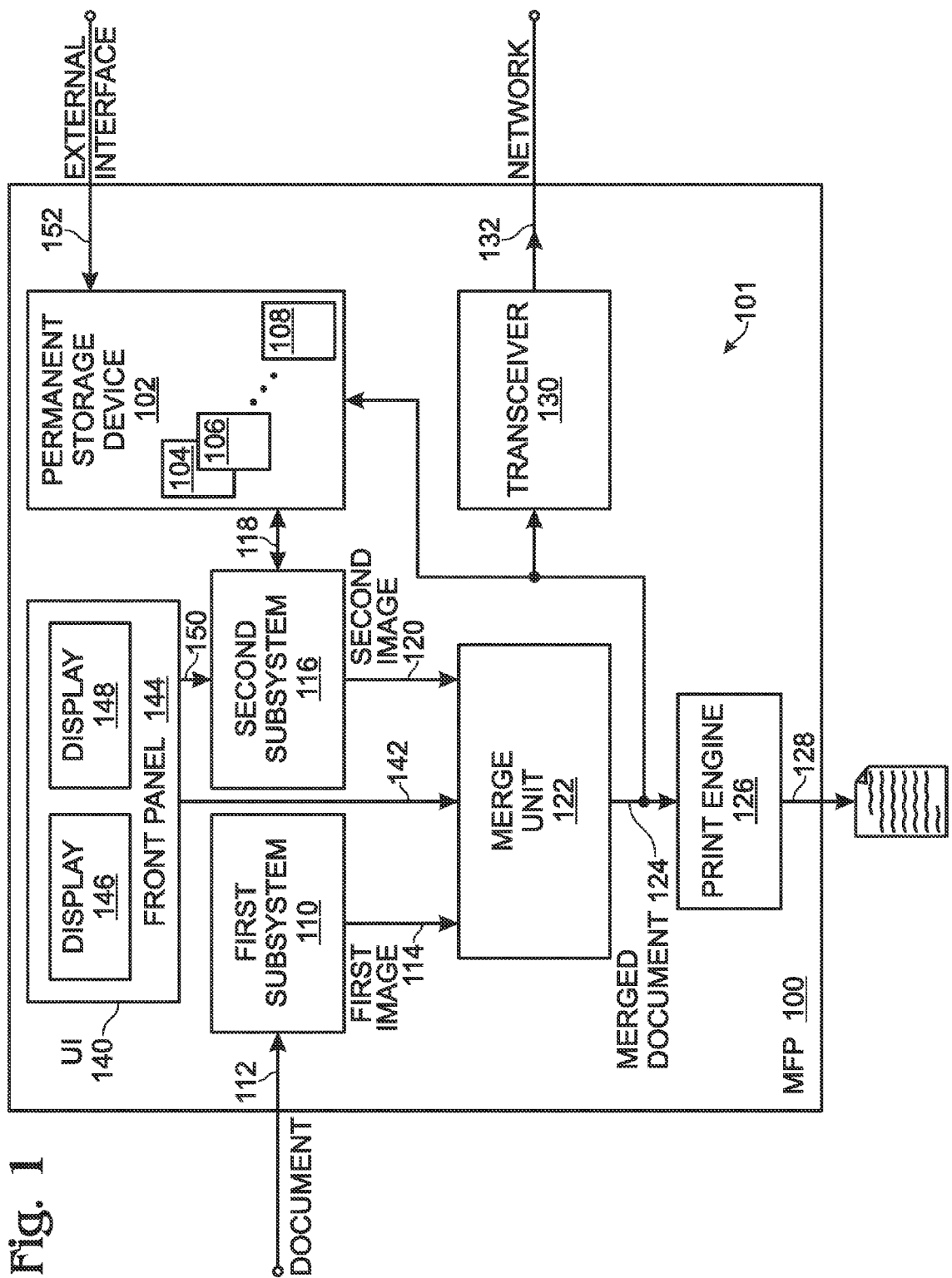
FIG. 1 is a schematic block diagram of the present invention multifunctional peripheral (MFP) stored resource overlay system.

FIG. 1 is a schematic block diagram of the present invention multifunctional peripheral (MFP) stored resource overlay system. As used herein, an MFP 100 can be a printer, copier, scanner, fax, or other device that includes the functionality described below. The system 101 comprises a permanent storage device 102 including a stored resource file. Shown are files 104, 106, and 108. However, the invention is not limited to any particular number of resource files. The permanent storage device 102 may save (have stored)

resource files that represent image types such as a logo, background, signature, border, graphic, picture, or overlay. The invention is not limited to any particular image type.

A first subsystem 110 has an interface on line 112 to accept a document and an interface on line 114 to supply document rasterized data. A second subsystem 116 has an interface on line 118 to access the resource file from the permanent storage device 102 and convert the resource file into an image. The second subsystem 116 has an interface on line 120 to supply the image. A merge unit 122 has an interface on line 114 to accept the document rasterized data and an interface on line 120 to accept image. The merge unit 122 merges the image with the document and supplies a merged document in an electronic format at an interface on line 124.

In one aspect, the system 101 comprises a print engine 126 having an interface on line 124 to accept the electronically formatted merged document and an interface on line 128 to supply a tangible media merged document. Alternately, the system 100 comprises a transceiver 130 having an interface on line 124 to accept the electronically formatted merged document and a network-connected interface on line 132 to electronically transmit the merged document. For example, the merged document may be sent to an IP address, or enclosed as an attachment in an email communication. Alternately, the MFP 100 may be locally connected, or connected through a local area network (LAN) to another node, such as a personal computer or server (not shown), that may perform additional processes on the merged document. In a different aspect, the merged document is stored in the permanent storage device 102, or in another storage device such as a floppy disk or CD (not shown).

The first subsystem 110 may accept either tangible (i.e., paper) media or electronically formatted documents that may be either text, for example Word, or image documents such as PDF or TIFF. In the case of the tangible media document, the MFP 100 functions as a copier or scanner. In the case of the electronically formatted document, the MFP 100 functions as a printer, for example. Regardless of the document format, typically the first subsystem 110 is a copier pipeline that converts the document to rasterized data and supplies a first image on line 112. The second subsystem 116 is a printer pipeline supplying a second image, converted from a resource file, as rasterized data on line 120. The merge unit 122 adds the first image to the second image and supplies the merged document as a rasterized data third image on line 124.

In one aspect, the system 101 further comprises a user interface (UI) 140 to accept selection commands for positioning the image with respect to the document. Likewise, the merge unit 122 has an interface on line 142 to accept selection commands from the UI 140. For example, the merge unit 122 may accept selection commands such as image size or image color. Commands may be accepted which dictate the document pages to be merged. For example, a command placing a logo image on even pages only. Further, the selection commands may involve print options. For example, a command may be issued to print and staple 5 copies of the merged document. Typically, the UI 140 is enabled as an MFP front panel 144, including a display 146 and keypad 148. However, other interface types, such as a stylus or virtual keypad are known and the invention is not limited to any particular type.

Figure 2:
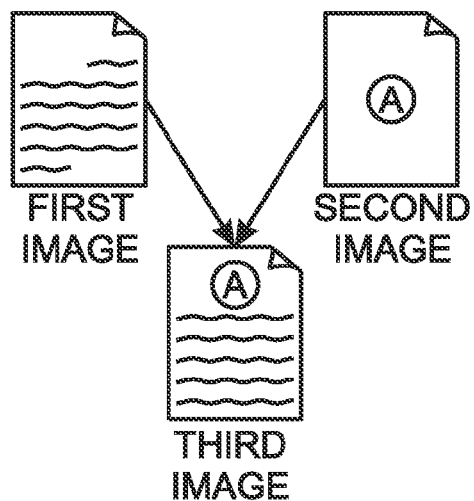
FIG. 2 is a drawing depicting an exemplary merged document.

FIG. 2 is a drawing depicting an exemplary merged document. Considering both FIGS. 1 and 2, the front panel display 146 may present a first image of the document and supply prompts for superimposing a second image, converted from an accessed resource file in permanent storage device 102, on the first image. The prompts may be graphical in nature, making the process more intuitive for the user. The keypad 148 can be used to accept user commands. Alternately, a touch screen or mouse (not shown) can be used. The merge unit 122 positions the second image, with respect to the first image, in response to the user commands.

In another aspect, the UI 140 accepts a selection command supplying a file name. For example, a directory or a menu (not shown) can be called up and presented on display 146. Then, the user can select a resource file from the directory. The printer pipeline 116 has an interface on line 150 to accept the file name. The printer pipeline 116 accesses a resource file 104 from the permanent storage device 102 corresponding to the supplied file name.

In some aspects, the printer pipeline or second subsystem 116 accesses a plurality of resource files from the permanent storage device 102, and the merge unit 122 merges a plurality of converted images with the document. For example, a logo and a border (more than one image) may be merged into a document. In another aspect, the copier pipeline or first subsystem 110 accepts a document with a plurality of pages and the merge unit 122 merges an image with a plurality of the document pages. That is, the merge unit 122 may add an image (or more than one image) to each page in the document, or to selected pages in the document.

In one aspect, the permanent storage device 102 has an external interface on line 152 to accept a resource file for storage. For example, the permanent storage device 102 may accept and store a PDL file representing an image. The permanent storage device 102 stores resource files in a first format page description language (PDL), such as printer control language (PCL) or PostScript (PS), or in a portable document format (PDF) or tagged image file format (TIFF). Note, the invention is not limited to any particular format. Then, the printer pipeline or second subsystem 116 converts the resource file in the first format to raster data and supplies the raster data image to the merge unit 122 on line 120. The printer pipeline or second subsystem 116 may supply the converted raster data image to the permanent storage device 102 for saving, to eliminate the need for a subsequent conversion process. A raster data file may be useful if the same image is to be merged into a plurality of documents, for example. However as noted above, raster data files consumes a great deal of memory. In some aspects the raster data file is temporary, and is deleted after use.

It should be appreciated that in some aspects of the system 101, a single pipeline may perform the functions of both the first subsystem 110 and the second subsystem 116. Further, many of the system elements presented above may be enabled as software, or as a combination or hardware and software, where a software element is understood to a list of microprocessor instructions that are stored in a memory. It should also be appreciated that many of the above-mentioned interfaces can be enabled using a common data/address bus.

FUNCTIONAL DESCRIPTION

Figure 3:
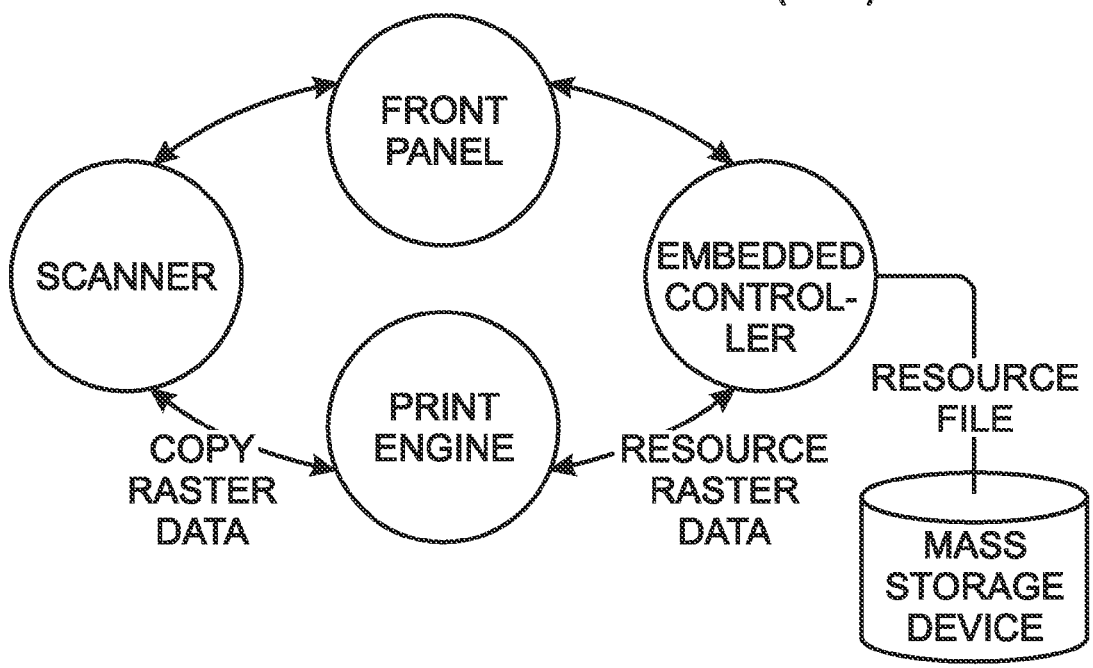
FIG. 3 shows components of a conventional MFP configuration (prior art).

FIG. 3 shows components of a conventional MFP configuration (prior art). A typical MFP contains a scanner for copying, an embedded controller for printing, and a print engine for printing the output onto hard copy. The scanner is conventionally responsible for scanning the document to be copied, processing the image data, and sending the rasterized output to the print engine. The embedded controller is conventionally responsible for processing print jobs that have been coded in PDLs, and sending the rasterized output to the print engine. The scan and print functions are typically performed as separate pipelines, with the output of both pipelines being rasterized data.

Figure 4:
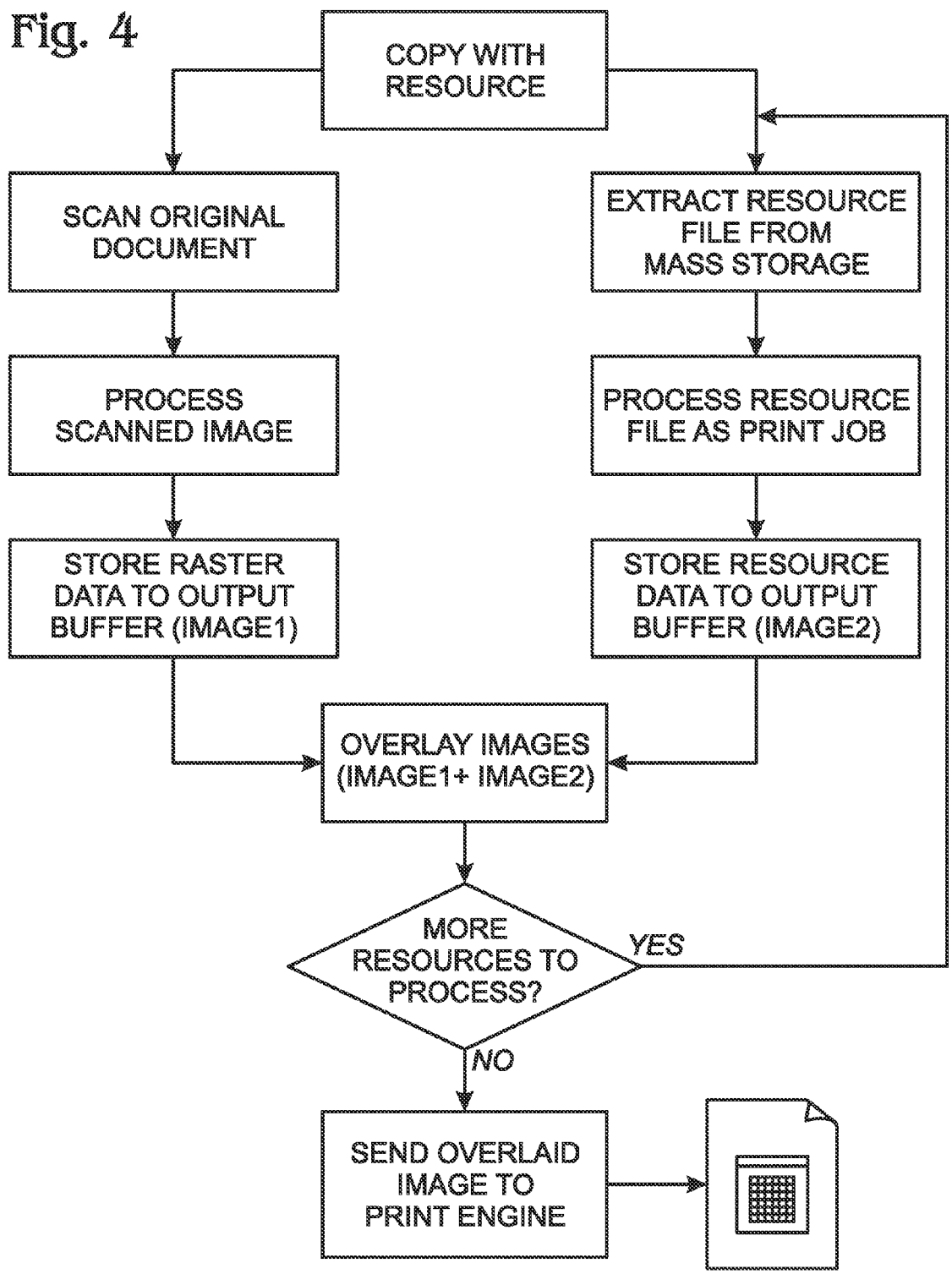
FIG. 4 depicts the present invention process for merging a stored resource into a document.

FIG. 4 depicts the present invention process for merging a stored resource into a document. This present invention permits resource image files that have been stored in the MFP mass storage device to be extracted and processed. The rasterized output of the resource image file is overlaid with the rasterized output of the scanned image.

Resource image files may be in a format such as raster data, PCL, PS, PDF, TIFF, or any other file format supported by the MFP. When a resource image is selected for a copy/scan job, the MFP software determines whether the resource image needs to be rasterized before being applied to the scanned image. If the resource image is a rasterized image, no additional processing is required, and the data is directly overlaid with the scanned image and sent to the print engine.

If the resource image file is not raster data, the resource image is submitted to the embedded controller, described above as the print pipeline or second subsystem, to be parsed and rasterized. The raster output of the resource image is overlaid to the raster output of the scan, and the combined image sent to the print engine. If the user so chooses, the rasterized data resource image file may be saved to mass storage to improve performance for the next copy job that uses this resource image.

Figure 5:
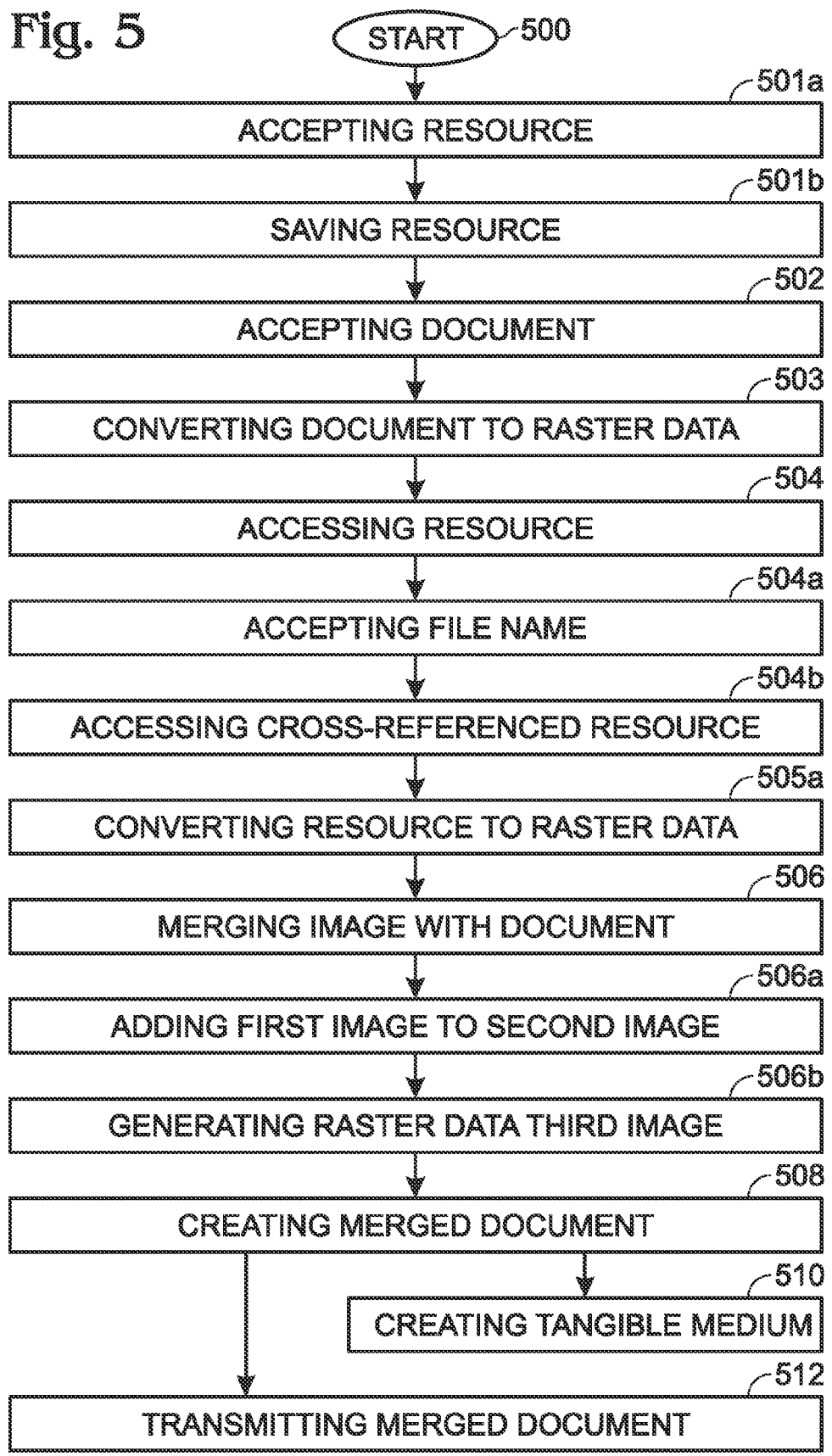
FIG. 5 is a flowchart illustrating another aspect of the present invention stored resource overlay method.

FIG. 5 is a flowchart illustrating another aspect of the present invention stored resource overlay method. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 500.

Step 502 accepts a document at an MFP, as defined above. The document accepted may be in a tangible media or an electronically formatted text or image document. Step 503 converts the accepted document into a raster data first image. Step 504 accesses a resource file saved in permanent storage. Step 505a converts the resource file into an image. Step 505a converts resource file image types such as logos, backgrounds, signatures, borders, graphics, pictures, and overlays. Step 506 merges the image with the document. Step 508 creates a merged document in an electronic format. Step 510, at a print engine, creates a tangible media merged document from the electronically formatted merged document. Alternately, Step 512 may electronically transmit the merged document.

As noted above, Step 503 converts the accepted document to a rasterized data first image. Likewise, converting a resource file into an image (Step 505a) includes converting a resource file into an image supplied as a rasterized data second image. Then, merging the image with the document in Step 506 includes substeps. Step 506a adds the first image to the second image. Step 506b generates a rasterized data third image.

In another aspect, merging the image with the document in Step 506 includes accepting position commands for positioning the image with respect to the document. For example, selection commands may involve image size, color, document pages to be merged, or print options. More explicitly, accepting selection commands may include: supplying a user interface (UI) with selection command prompts at a printer front panel; and, accepting user commands from the UI.

For example, accepting position commands for positioning the image with respect to the document in Step 506 may include additional substeps (not shown). Step 506c, on a printer display, presents a first image of the document and supplies prompts for superimposing a second image, converted from a resource file in storage, on the first image. Step 506d receives user commands on the UI. Step 506e positions the second image, with respect to the first image, in response to the commands.

In another aspect, accessing a resource file saved in permanent storage in Step 504 may include substeps. Step 504a accepts file name selection commands via the UI. Step 504b accesses the resource file in permanent storage cross-referenced to the file name.

In one aspect, accessing a resource file saved in permanent storage in Step 504 includes accessing a plurality of resource files. Then, merging the image with the document in Step 506 includes merging a plurality of converted images with the document. That is, more than one image can be converted and merged. In a different aspect, Step 502 accepts a document with a plurality of pages, and Step 506 merges an image with a plurality of document pages. That is, the user can select the document pages onto which the converted image, or images are to be merged.

In some aspects Step 504 accesses a resource file stored in a first format such as printer control language (PCL), PostScript (PS), portable document format (PDF), or tagged image file format (TIFF). Then, Step 505a converts the resource file in the first format to raster data. In another aspect, Step 505b (not shown) saves the raster date image in permanent storage.

In another aspect, Step 501a accepts an image via an MFP external interface, and Step 501b saves the image in permanent storage.

A system and method have been providing for using an MFP to merge a stored resource onto a document. A few examples have been provided of options that can be used to speed and/or add value to the process. However, the invention may be enabled using other features. Other variations and embodiments of the invention will occur to those skilled in the art.

We claim:

1. A stored resource overlay method, the method comprising:
   supplying a user interface (UI) with selection command prompts at a printer front panel;
   accepting user commands from the UI;
   at a multifunctional peripheral (MFP), accepting a document selected from a group consisting of a tangible media document accepted via a copier/scanner interface and an electronically formatted document accepted via a printer interface;
   converting the accepted document to a rasterized image document;
   selecting a resource file from a library including a plurality of resource files saved in permanent storage;
   converting the resource file into an image;
   merging the image with the rasterized image document in response to the user commands;
   creating a merged document in an electronic format; and,
   wherein converting the resource file to an image includes converting a resource file image type selected from the group including a logo, background, signature, border, graphic, picture, and overlay.

2. The method of claim 1 further comprising:
   at a print engine, creating a tangible media merged document from the electronically formatted merged document.

3. The method of claim 1 wherein accepting an electronically formatted document includes accepting a document selected from the group including text and image documents.

4. The method of claim 1 further comprising:
   electronically transmitting the merged document.

5. The method of claim 2 wherein converting the document to the rasterized image document includes creating
a rasterized data first image; and,
wherein converting the resource file into an image includes converting the resource file into an image supplied as a rasterized data second image.

6. The method of claim 5 wherein merging the image with the rasterized image document includes:
adding the first image to the second image; and,
generating a rasterized data third image.

7. The method of claim 1 wherein merging the image with the rasterized image document includes accepting position commands for positioning the image with respect to the rasterized image document.

8. The method of claim 7 wherein merging the image with the rasterized image document includes accepting selection commands chosen from the group including image size, color, document pages to be merged, and print options.

9. The method of claim 7 wherein accepting position commands for positioning the image with respect to the rasterized image document includes:
on a printer display, presenting a first image of the document and supplying prompts for superimposing a second image, accessed from storage, on the first image;
receiving user commands via the UI;
positioning the second image, with respect to the first image, in response to the commands.

10. The method of claim 1 wherein selecting the resource file saved in permanent storage includes accessing a plurality of resource files; and,
wherein merging the image with the rasterized image document includes merging a plurality of converted images with the rasterized image document.

11. The method of claim 1 wherein accepting a document includes accepting a document with a plurality of pages; and,
wherein merging the image with the rasterized image document merging an image with a plurality of rasterized image document pages.

12. The method of claim 1 wherein selecting the resource file saved in permanent storage includes accessing a resource file stored in a first format selected from the group including printer control language (PCL), PostScript (PS), portable document format (PDF), and tagged image file format (TIFF).

13. The method of claim 5 further comprising:
saving the rasterized data first image in permanent storage.

14. The method of claim 1 further comprising:
accepting a resource file via an MFP external interface; and,
saving the resource file in permanent storage.

15. The method of claim 1 wherein accessing a resource file saved in permanent storage includes:
accepting a file name selection command via the UI; and,
accessing the resource file in permanent storage cross-referenced to the file name.

16. A stored resource overlay method, the method comprising:
supplying a user interface (UI) with selection command prompts at a printer front panel;
accepting user commands from the UI;
at a multifunctional peripheral (MFP), accepting a document selected from a group consisting of a tangible media document accepted via a copier/scanner interface and an electronically formatted document accepted via a printer interface;
converting the accepted document to a rasterized image document;
selecting a resource file from a library including a plurality of resource files saved in permanent storage;
converting the resource file into an image;
merging the image with the rasterized image document in response to the user commands;
creating a merged document in an electronic format; and,
wherein selecting the resource file saved in permanent storage includes accessing a resource file stored in a first format selected from the group including printer control language (PCL), PostScript (PS), portable document format (PDF), and tagged image file format (TIFF).

* * * * *